United States Patent
Mizukusa et al.

(10) Patent No.: US 10,225,899 B2
(45) Date of Patent: Mar. 5, 2019

(54) LIGHT SYSTEM FOR PLANT CULTIVATION

(71) Applicant: KOWA COMPANY, LTD., Aichi (JP)

(72) Inventors: Yutaka Mizukusa, Tokyo (JP); Kenichi Inoue, Aichi (JP); Kazuhiro Kashiwagi, Aichi (JP); Ayafumi Taniji, Aichi (JP)

(73) Assignee: KOWA COMPANY, LTD. (JP)

( * ) Notice: Subject to any disclaimer, the term of this patent is extended or adjusted under 35 U.S.C. 154(b) by 0 days.

(21) Appl. No.: 15/565,768

(22) PCT Filed: Mar. 17, 2016

(86) PCT No.: PCT/JP2016/058432
§ 371 (c)(1),
(2) Date: Oct. 11, 2017

(87) PCT Pub. No.: WO2016/167072
PCT Pub. Date: Oct. 20, 2016

(65) Prior Publication Data
US 2018/0124888 A1    May 3, 2018

(30) Foreign Application Priority Data
Apr. 14, 2015    (JP) .................................. 2015-082623

(51) Int. Cl.
*H05B 37/02*        (2006.01)
*H05B 33/08*        (2006.01)
(Continued)

(52) U.S. Cl.
CPC ........... *H05B 33/0845* (2013.01); *A01G 7/00* (2013.01); *A01G 7/045* (2013.01); *A01G 31/00* (2013.01);
(Continued)

(58) Field of Classification Search
CPC ............ H05B 33/0815; H05B 33/0839; H05B 33/0845; H05B 33/0887; A01G 7/045
(Continued)

(56) References Cited

U.S. PATENT DOCUMENTS 4,749,916 A * 6/1988 Yamazaki .............. A01G 7/045
                                                    315/254
5,012,609 A    5/1991 Ignatius et al. ................... 47/58
(Continued)

FOREIGN PATENT DOCUMENTS

JP        63036714        2/1988
JP        64020034        1/1989
(Continued)

OTHER PUBLICATIONS

International Search Report dated Apr. 19, 2016 issued in International Application No. PCT/JP2016/058432 together with English-language translation thereof.
(Continued)

*Primary Examiner* — Tung X Le
(74) *Attorney, Agent, or Firm* — Adams & Wilks (57) ABSTRACT

A lighting system for plant cultivation comprises a light source, a light source driving unit that drives the light source, and a control unit that transmits a pulse signal to the light source driving unit. The control unit comprises a first pulse generating unit that generates a first pulse signal (S1) of a predetermined frequency, a second pulse generating unit that generates a second pulse signal (S2) of a frequency different from the predetermined frequency, and a pulse signal selecting unit that selects any one of the first pulse signal (S1) and the second pulse signal (S2) to transmit the selected one to the light source driving unit. The light source driving unit includes a frequency determining unit that determines whether the frequency of the pulse signal received from the control unit is the frequency of the first pulse signal (S1) or the frequency of the second pulse signal
(Continued)

(S2), a first driving unit that, when receiving the first pulse signal (S1) from the control unit, converts the first pulse signal (S1) to a constant current, output to drive the light source, and a second driving unit that, when receiving the second pulse signal (S2) from the control unit, outputs a pulse with an original pulse waveform of the second pulse signal (S2) to drive the light source.

4 Claims, 4 Drawing Sheets

(51) Int. Cl.
  *A01G 7/00* (2006.01)
  *A01G 31/00* (2018.01)
  *A01G 7/04* (2006.01)
(52) U.S. Cl.
  CPC ......... *H05B 37/02* (2013.01); *H05B 37/0281* (2013.01); *Y02B 20/42* (2013.01)
(58) Field of Classification Search
  USPC .............................. 315/294, 312, 360; 47/58
  See application file for complete search history.

(56) References Cited

U.S. PATENT DOCUMENTS

| | | | | |
|---|---|---|---|---|
| 2003/0009933 | A1* | 1/2003 | Yoneda | A01G 7/045 47/1.01 R |
| 2011/0115385 | A1* | 5/2011 | Waumans | A01G 7/045 315/152 |
| 2013/0139437 | A1* | 6/2013 | Maxik | H05B 37/02 47/58.1 LS |
| 2014/0259905 | A1* | 9/2014 | Ovadya | A01G 22/00 47/58.1 LS |
| 2016/0014974 | A1* | 1/2016 | Grajcar | A01G 7/045 47/58.1 LS |
| 2016/0113213 | A1* | 4/2016 | Berinsky | A01G 7/045 47/58.1 LS |

FOREIGN PATENT DOCUMENTS

| | | |
|---|---|---|
| JP | 5115219 | 5/1993 |
| JP | 9275779 | 10/1997 |
| JP | 2013128483 | 7/2013 |
| JP | 3194355 | 11/2014 |
| WO | 01062070 | 8/2001 |

OTHER PUBLICATIONS

"Effect of Pulse Light on Photosynthesis Rate of Plants," Plant Factory Laboratory (online, searched on Mar. 20, 2015), Internet <URL: http://www.sasrc.jp/pulse.htm>.
European Search Report dated Oct. 17, 2018 in Application No. 16779864.4.

* cited by examiner

LIGHT SYSTEM FOR PLANT CULTIVATION

TECHNICAL FIELD

The present invention relates to a lighting system for plant cultivation that is used in a plant cultivation method for cultivating plants using artificial light sources.

BACKGROUND ART

Plant cultivation using artificial light sources is generally performed in a flow in which seeds are first set for germination (seeding period), seedlings are then grown (seedling growth period), grown seedlings are planted in a medium (planting period), and plants grown to an appropriate size are harvested (harvest period).

Photosynthesis of plants progresses in accordance with a cycle of a light reaction that requires light energy and a dark reaction that does not require light energy, as disclosed in Patent Literature 1. According to past researches, it is said that the cycle of the light reaction and dark reaction is about 200 to 400 μsec period (see Non-Patent Literature 1). It may therefore be possible to significantly save the power consumption by controlling exposure of plants to light to match the above-described period so that the plants are exposed to light only during the light reaction and are not exposed to light during the dark reaction. For example, setting the duty ratio of exposure to light at 50% allows the power consumption to be half as compared with the case of continuous exposure.

PRIOR ART LITERATURE

Patent Literature

[Patent Literature 1] JP64-020034A

Non-Patent Literature

[Non-Patent Literature 1] "Effect of Pulse Light on Photosynthesis Rate of Plants," Plant Factory Laboratory (online, searched on Mar. 20, 2015), Internet <URL: http://www.sasrc.jp/pulse.htm>

SUMMARY OF THE INVENTION

Problems to be Solved by the Invention

Thus, efficient cultivation of plants by lighting can be realized to suppress the power consumption in the planting period using a lighting system in which the light source is controlled to achieve a light and dark period corresponding to the cycle of photosynthesis. In the seeding period and the seedling growth period, however, a spindly growth phenomenon may occur depending on the type of plants if the plants are not exposed to continuous light. It may therefore be not preferred to use a lighting system that intermittently exposes the plants to light as the above, which may be problematic. Moreover, in some cases, such as during the harvest period, workers may enter the cultivation room to work there, but this may possibly lead to deconditioning of the workers due to the work in the flickering light.

The present invention has been made in consideration of the above and an object of the present invention is to provide a lighting system for plant cultivation that can appropriately control the exposed state to light to match various conditions, such as growth situations and cultivation environments for plants and cultivated varieties.

Means for Solving the Problems

To achieve the above object, first, the present invention provides a lighting system for plant cultivation configured to be capable of switching between an intermittent lighting mode and a continuous lighting mode, the intermittent lighting mode being a mode in which a light source emits light with a lighting cycle comprising a light period of turning on the light source for a predetermined time period and a dark period of turning off the light source for a predetermined time period, the continuous lighting mode being a mode in which the light source continuously emits light (Invention 1).

According to the above invention (Invention 1), when exposure to light in a light and dark period corresponding to the cycle of photosynthesis is required, the light source can be controlled to be in the intermittent lighting mode, while when the intermittent lighting mode is disadvantageous, the light source can be controlled to be in the continuous lighting mode. It is therefore possible to appropriately control the exposed state to light to match various conditions, such as growth situations and cultivation environments for plants and cultivated varieties.

In the above invention (Invention 1), the switching between the intermittent lighting mode and the continuous lighting mode may preferably be capable of being scheduled in accordance with the variety of a plant to be cultivated (Invention 2).

According to the above invention (Invention 2), the efficiency in plant cultivation and power saving can be achieved because the switching at each time is not necessary by preliminarily scheduling the switching between the intermittent lighting mode and the continuous lighting mode in accordance with the variety of a plant to be cultivated.

Second, the present invention provides alighting system for plant cultivation comprising: a light source; a light source driving unit that drives the light source; and a control unit that transmits a pulse signal to the light source driving unit, the control unit comprising: a first pulse generating unit that generates a first pulse signal of a predetermined frequency; a second pulse generating unit that generates a second pulse signal of a frequency different from the predetermined frequency; and a pulse signal selecting unit that selects any one of the first pulse signal and the second pulse signal to transmit the selected one to the light source driving unit, the light source driving unit comprising: a frequency determining unit that determines whether the frequency of the pulse signal received from the control unit is the frequency of the first pulse signal or the frequency of the second pulse signal; a first driving unit that, when receiving the first pulse signal from the control unit, converts the first pulse signal to a constant current output to drive the light source; and a second driving unit that, when receiving the second pulse signal from the control unit, outputs a pulse with an original pulse waveform of the second pulse signal to drive the light source (Invention 3).

According to the above invention (Invention 3), when the exposure to light in a light and dark period corresponding to the cycle of photosynthesis is required, the pulse signal selecting unit may select the second pulse signal, which is generated in the second pulse generating unit of the control unit, and transmit the second pulse signal to the light source driving unit, and the second driving unit may drive the light source, which can thereby be controlled to be in the intermittent lighting mode. When the intermittent lighting mode is disadvantageous, the pulse signal selecting unit may select the first pulse signal, which is generated in the first pulse generating unit of the control unit, and transmit the first pulse signal to the light source driving unit, and the first driving unit may drive the light source, which can thereby be controlled to be in the continuous lighting mode. It is therefore possible to appropriately control the exposed state to light to match various conditions, such as growth situations and cultivation environments for plants and cultivated varieties.

In the above invention (Invention 3), the lighting system for plant cultivation may further comprise a data storage unit that can store control data for controlling the pulse signal selecting unit in accordance with the variety of a plant to be cultivated, and the control unit may preferably control an operation of the pulse signal selecting unit on the basis of the control data stored in the data storage unit (Invention 4).

According to the above invention (Invention 4), the efficiency in plant cultivation and power saving can be achieved because the switching at each time is not necessary by preliminarily scheduling the switching between the intermittent lighting mode and the continuous lighting mode in accordance with the variety of a plant to be cultivated and storing the schedule as control data in the data storage unit.

In the above invention (Invention 3, 4), the lighting system for plant cultivation may further comprise an entry and exit information notifying unit that notifies the control unit of entry information in accordance with entry of a person into a cultivation area and notifies the control unit of exit information in accordance with exit of a person from the cultivation area and, during a period from when the entry and exit information notifying unit notifies the control unit of the entry information to when the entry and exit information notifying unit notifies the control unit of the exit information, the control unit may preferably make the pulse signal selecting unit select the first pulse signal (Invention 5).

According to the above invention (Invention 5), when a person enters the cultivation area, the mode can be automatically switched to the continuous lighting mode regardless of the schedule and it is thus possible to prevent deconditioning of the person due to work in the flickering light.

Advantageous Effect of the Invention

The lighting system for plant cultivation according to the present invention can appropriately control the exposed state to light to match various conditions, such as growth situations and cultivation environments for plants and cultivated varieties.

EMBODIMENTS FOR CARRYING OUT THE INVENTION

Figure 1:
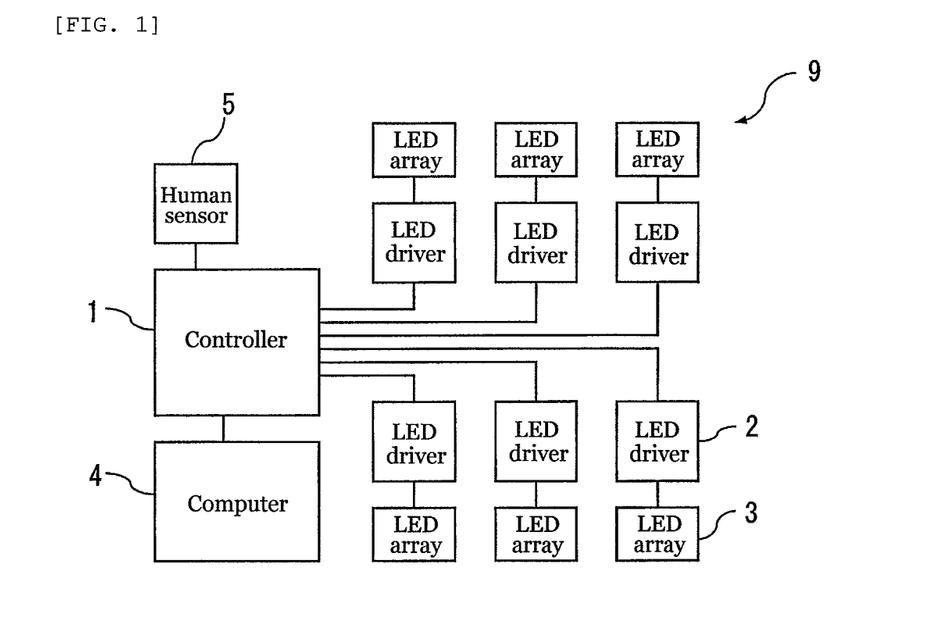
FIG. 1 is an explanatory view illustrating the overall configuration of a lighting system for plant cultivation according to an embodiment of the present invention.

Hereinafter, one or more embodiments of the present invention will be described in detail with reference to the drawings. FIG. 1 is an explanatory view illustrating the overall configuration of a lighting system for plant cultivation 9 according to an embodiment of the present invention. The lighting system for plant cultivation 9 may be configured to include a controller 1, a plurality of LED drivers (six LED drivers 2 in the present embodiment) that are connected to the controller 1, a plurality of LED arrays 3 (six LED arrays 3 in the present embodiment) that are connected to respective LED drivers 2, and a computer 4 and a human sensor 5 that are connected to the controller 1. The lighting system for plant cultivation 9 may be used in a plant cultivation area (not illustrated) in a plant factory in which plants such as desired leaf vegetables are cultivated by exposure to light. In the present embodiment, all of the LED drivers 2 may have the same configuration and all of the LED arrays 3 may also have the same configuration. The numbers of the LED drivers 2 and LED arrays 3 connected to the controller 1 (one controller 1) are each six in the present embodiment, but are not limited to this and may be appropriately changed in accordance with the location of the plant cultivation factory, the size of the plant cultivation area, the number of necessary light sources, and other factors.

Figure 2:
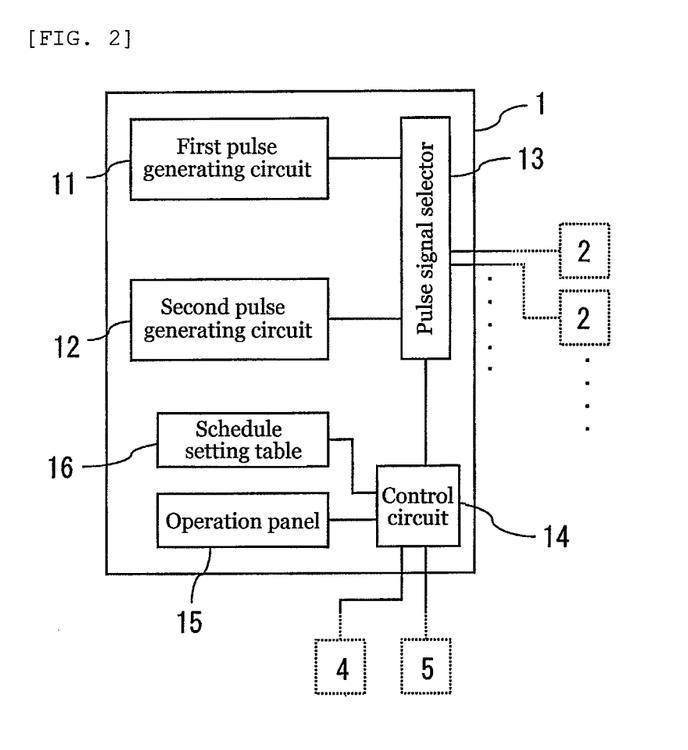
FIG. 2 is an explanatory view illustrating the configuration of a controller according to the embodiment.

The controller 1 may generate pulse signals that are necessary for the LED drivers 2 to drive respective LED arrays 3, and transmit the pulse signals to the LED drivers 2. As illustrated in FIG. 2, the controller 1 may be configured to include a first pulse generating circuit 11 that generates a first pulse signal, a second pulse generating circuit 12 that generates a second pulse signal, a pulse signal selector 13 through which the first pulse signal is transmitted from the first pulse generating circuit 11 and the second pulse signal is transmitted from the second pulse generating circuit 12, a control circuit 14 that controls the pulse signal selector 13, an operation panel 15 for operating the control circuit 14, and a schedule setting table 16 that sets a schedule for controlling the pulse signal selector 13.

The first pulse generating circuit 11 may be a circuit that generates a first pulse signal $S_1$ of a frequency of 1 kHz, and can freely vary a duty ratio of the first pulse signal $S_1$. The generated first pulse signal $S_1$ may be transmitted to the pulse signal selector 13 via a transmission path. A known pulse generating circuit can be employed as the first pulse generating circuit 11.

The second pulse generating circuit 12 may be a circuit that generates a second pulse signal $S_2$ of a frequency of 2.5 kHz, and the duty ratio of the second pulse signal $S_2$ may be a fixed value that is determined within a range of 30% to 50% in accordance with the type of plants. The generated second pulse signal $S_2$ may be transmitted to the pulse signal selector 13 via a transmission path. A known pulse generating circuit can be employed as the second pulse generating circuit 12.

The frequencies of the first pulse signal $S_1$ and the second pulse signal $S_2$ are not limited to the above and other frequencies can also be employed, provided that at least they are different frequencies from each other. The frequency of the first pulse signal $S_1$ may preferably be set around 1 kHz which is used, for example, in signal line-type dimming control of a commonly-used lighting apparatus. Such a frequency allows the light sources to be appropriately controlled. The frequency of the second pulse signal $S_2$ may preferably be set, for example, within a range of 2 to 5 kHz because it is said that the cycle of the light reaction and dark reaction in plants is about 200 to 400 μsec period. Such a range allows the light sources to be appropriately controlled.

The pulse signal selector 13, which is connected to the first pulse generating circuit 11 and the second pulse generating circuit 12 via transmission paths, may receive the first pulse signal $S_1$ from the first pulse generating circuit 11 and the second pulse signal $S_2$ from the second pulse generating circuit 12. The pulse signal selector 13 may select any one of the received first pulse signal $S_1$ and second pulse signal $S_2$ and transmit the selected first pulse signal $S_1$ or second pulse signal $S_2$ to each of the LED drivers 2 via a transmission path. In the present embodiment, the pulse signal may be transmitted to the six LED drivers 2 via six transmission paths.

A circuit having a switcher configuration of a commonly-used digital OR circuit, for example, can be employed as the pulse signal selector 13, but the pulse signal selector 13 is not limited to this. It suffices that the pulse signal selector 13 can selectively transmit a pulse signal received from any of two pulse generating circuits to the LED drivers 2 via transmission paths.

The control circuit 14 is to control the operation of the pulse signal selector 13 and may specifically command the pulse signal selector 13 to select any of the first pulse signal $S_1$ and the second pulse signal $S_2$ to be transmitted to the LED drivers 2. The operation panel 15 for operating the control circuit 14, and the schedule setting table 16 which sets the schedule for controlling the pulse signal selector 13, may be connected to the control circuit 14. The computer 4 and the human sensor 5 may also be connected to the control circuit 14. The computer 4 can store control data for controlling the pulse signal selector 13 in accordance with the variety of plants to be cultivated. The human sensor 5 may be provided in the vicinity of an entrance (not illustrated) through which a person can enter the plant cultivation area in the plant factory. A known control circuit, such as using a CPU, can be employed as the control circuit 14.

By employing the controller 1 as described above, it is possible to generate two pulse signals $S_1$ and $S_2$ having different frequencies and selectively transmit any one of the generated first pulse signal $S_1$ and second pulse signal $S_2$ to the LED drivers 2. The controller 1 can specify any of the first pulse signal $S_1$ and the second pulse signal $S_2$ to be selected via the operation panel 15 at each time. The controller 1 can also use the schedule setting table 16 to preliminarily set a schedule as to which of the first pulse signal $S_1$ and the second pulse signal $S_2$ is to be selected at which timing.

Figure 3:
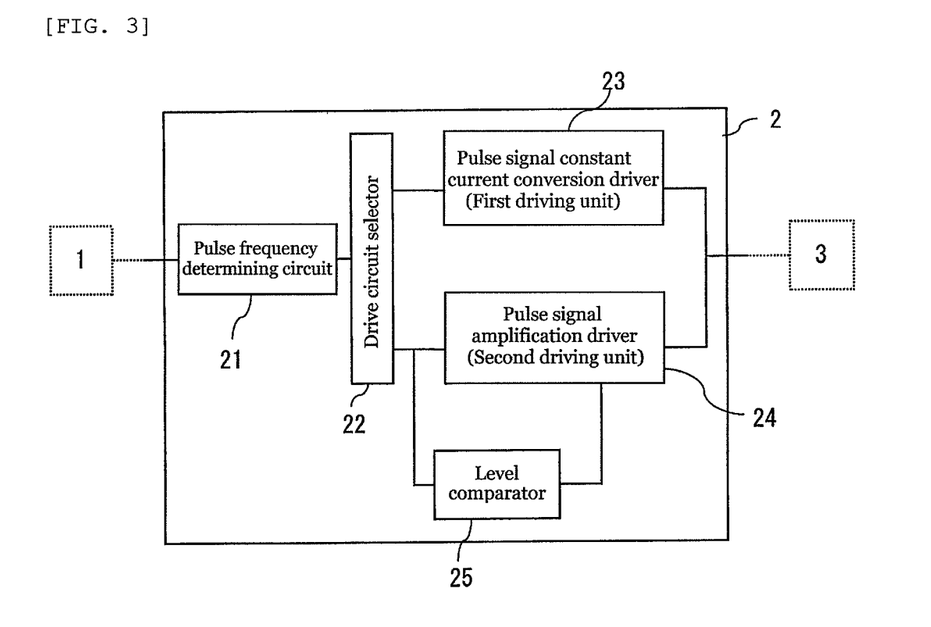
FIG. 3 is an explanatory view illustrating the configuration of an LED driver according to the embodiment.

The LED drivers 2 may output current for driving the LED arrays 3 to the LED arrays 3 on the basis of the pulse signal transmitted from the controller 1. As illustrated in FIG. 3, each LED driver 2 may be configured to include a pulse frequency determining circuit 21 that determines whether the frequency of the pulse signal transmitted from the controller 1 is the frequency of the first pulse signal $S_1$ or the frequency of the second pulse signal $S_2$, a drive circuit selector 22 that transmits the pulse signal, which is transmitted from the controller 1, to a pulse signal constant current conversion driver 23 when the pulse signal is the first pulse signal $S_1$ and transmits the pulse signal to a pulse signal amplification driver 24 when the pulse signal is the second pulse signal $S_2$, the pulse signal constant current conversion driver 23 which converts the first pulse signal $S_1$ to a constant current output and outputs it to the corresponding LED array 3, the pulse signal amplification driver 24 which outputs pulses with the original pulse waveform of the second pulse signal $S_2$ to the corresponding LED array 3, and a level comparator 25 that adjusts the height of the pulse signal in the pulse signal amplification driver 24.

The pulse signal constant current conversion driver 23 of the LED driver 2 may correspond to a first driving unit for driving the LED array 3 in a continuous lighting mode on the basis of the first pulse signal $S_1$ transmitted from the controller 1. The continuous lighting mode is a mode in which the LED array 3 continuously emits light. The pulse signal amplification driver 24 and level comparator 25 of the LED driver 2 may correspond to a second driving unit for driving the LED array 3 in an intermittent lighting mode on the basis of the second pulse signal $S_2$ transmitted from the controller 1. The intermittent lighting mode is a mode in which the LED array 3 emits light with a lighting cycle comprising a light period of turning on the LED array 3 for a predetermined time period and a dark period of turning off the LED array 3 for a predetermined time period.

The pulse frequency determining circuit 21 may determine whether the frequency of the pulse signal transmitted from the controller 1 is the frequency of the first pulse signal $S_1$ or the frequency of the second pulse signal $S_2$ and transmit the determination result to the drive circuit selector 22. A known frequency determining circuit can be employed as the pulse frequency determining circuit 21.

When the pulse signal transmitted from the pulse frequency determining circuit 21 is the first pulse signal $S_1$, the drive circuit selector 22 may transmit the first pulse signal $S_1$ to the pulse signal constant current conversion driver 23 via a transmission path. When the pulse signal transmitted from the pulse frequency determining circuit 21 is the second pulse signal $S_2$, the drive circuit selector 22 may transmit the second pulse signal $S_2$ to the pulse signal amplification driver 24 via a transmission path. Whether the pulse signal transmitted from the pulse frequency determining circuit 21 is the first pulse signal $S_1$ or the second pulse signal $S_2$ may be determined on the basis of the determination result transmitted from the pulse frequency determining circuit 21.

A circuit having a configuration of a commonly-used analog switch OR circuit, for example, can be employed as the drive circuit selector 22, but the drive circuit selector 22 is not limited to this. It suffices that the drive circuit selector 22 can select any of the pulse signal constant current conversion driver 23 and the pulse signal amplification driver 24 as a destination on the basis of the determination result transmitted from the pulse frequency determining circuit 21 and transmit the pulse signal transmitted from the pulse frequency determining circuit 21 to the selected destination via a transmission path.

Figure 4:
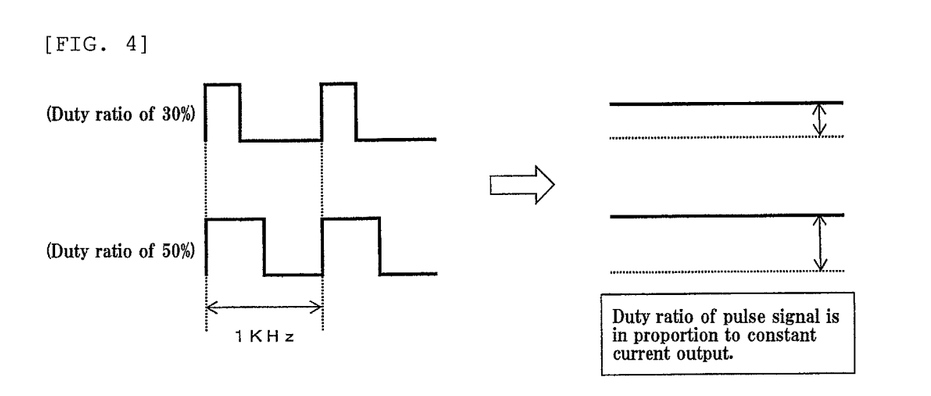
FIG. 4 is an explanatory view illustrating a situation of constant current output based on the waveform of a first pulse signal and the first pulse signal according to the embodiment.

The pulse signal constant current conversion driver 23 may convert the first pulse signal $S_1$, which is transmitted from the drive circuit selector 22, to a constant current output and output it to the LED array 3. When the pulse signal is converted to a constant current, the duty ratio of the pulse signal is in proportion to the constant current output, as illustrated in FIG. 4. For example, when the first pulse signal $S_1$ having a pulse waveform of duty ratio of 30% is transmitted to the pulse signal constant current conversion driver 23, the constant current output is three fifths of the constant current output obtained when the first pulse signal $S_1$ having a pulse waveform of duty ratio of 50% is transmitted to the pulse signal constant current conversion driver 23. Thus, by employing such a pulse signal constant current conversion driver 23, the LED array 3 can be driven in the continuous lighting mode with a dimming function.

A commonly-used circuit for an LED dimming scheme can be employed as the pulse signal constant current conversion driver 23. For example, such a circuit may comprise a duty determining circuit, a current adjusting circuit, and a constant current circuit. When a pulse signal is input to the duty determining circuit, its determination value may be input as an analog signal to the current adjusting circuit to drive the constant current circuit. However, the pulse signal constant current conversion driver 23 is not limited to the above. It suffices that the pulse signal constant current conversion driver 23 can convert the first pulse signal $S_1$, which is transmitted from the drive circuit selector 22, to a constant current output and output it to the LED array 3.

Figure 5:
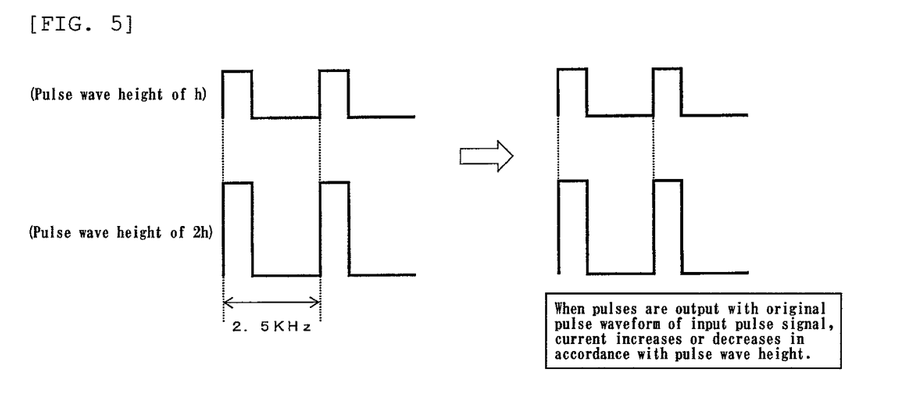
FIG. 5 is an explanatory view illustrating a situation of pulse output based on the waveform of a second pulse signal and the second pulse signal according to the embodiment.

The pulse signal amplification driver 24 may output pulses with the original pulse waveform of the second pulse signal $S_2$, which is transmitted from the drive circuit selector 22, to the LED array 3. When the second pulse signal $S_2$ is output as pulses with the original pulse waveform, the LED array 3 can be driven in the intermittent lighting mode in which the LED array 3 emits light so that the lighting and extinction are repeated with a period of that pulse waveform. In an embodiment, when the second pulse signal $S_2$ is output as pulses with the original pulse waveform, the output current may increase or decrease in accordance with the height of the pulse waveform (pulse wave height), as illustrated in FIG. 5. For example, when the LED array 3 is required to be driven in the intermittent lighting mode with the light power twice the light power in the case of transmitting the second pulse signal $S_2$ having a pulse waveform of a pulse wave height of h to the pulse signal amplification driver 24, the level comparator 25 may be used to adjust the height of the pulse waveform so that the pulse wave height is twice the pulse wave height h, that is, 2h.

A circuit having an appropriate configuration, such as a current amplifier circuit using one or more transistors for amplification, for example, can be employed as the pulse signal amplification driver 24. A threshold determining circuit using an analog comparator, or a circuit having an appropriate configuration, such as an AD convertor, for example, can be employed as the level comparator 25. However, the pulse signal amplification driver 24 and the level comparator 25 are not limited to the above. It suffices that the pulse signal amplification driver 24 and/or the level comparator 25 can output pulses with the original pulse waveform of the second pulse signal $S_2$, which is transmitted from the drive circuit selector 22, to the LED array 3. In an embodiment, the pulse signal amplification driver 24 and/or the level comparator 25 may preferably be able to adjust the pulse wave height of the second pulse signal $S_2$.

Each LED array 3 may be a light source in which a plurality of LEDs is arranged on a substrate or housing or in a housing. The LEDs may be connected in series or in parallel. The number and arrangement of the LEDs can be arbitrarily determined in accordance with the location of the plant cultivation factory, the size of the plant cultivation area, necessary light power, and other factors.

The computer 4 may function as a data storage unit that preliminarily stores control data for controlling the pulse signal selector 13 in accordance with the variety of plants to be cultivated in the plant cultivation area. The control data may be prepared, for example, for each variety of the object to be cultivated, such as lettuce, butter lettuce, arugula, and Japanese komatsuna, and may be used to control the pulse signal selector 13 so that an optimized lighting state can be achieved with consideration for growth situations and cultivation environments for plants. The control data may be read into the control circuit 14 from the computer 4 as necessary. Thus, by preliminarily scheduling the switching between the intermittent lighting mode and the continuous lighting mode in accordance with the variety of plants to be cultivated and storing the schedule as control data in the computer 4, the efficiency in plant cultivation and power saving can be achieved because the operation panel 15 may not have to be used at each time to specify any of the first pulse signal $S_1$ and the second pulse signal $S_2$ to be selected.

The human sensor 5 may be provided in the vicinity of an entrance (not illustrated) through which a person can enter the plant cultivation area in the plant factory. When a person enters the area through the entrance, the human sensor 5 can detect the entry of the person. When detecting the entry of a person, the human sensor 5 may transmit a notification signal to the control circuit 14. The notification signal is to notify the control circuit 14 of entry information. When a person exits the area through the entrance, the human sensor 5 can detect the exit of the person and transmit a notification signal to the control circuit 14. The notification signal is to notify the control circuit 14 of exit information.

An operation process of the lighting system for plant cultivation 9 will then be described. When the LED arrays 3 are required to be driven in the continuous lighting mode, the operation panel 15 may be used to make the control circuit 14 command the pulse signal selector 13 to select the first pulse signal $S_1$ and transmit it to the LED drivers 2. When the pulse signal selector 13 selects the first pulse signal $S_1$ and transmits it to the LED drivers 2, the first pulse signal $S_1$ may be input to the pulse frequency determining circuit 21 of the LED driver 2. The pulse frequency determining circuit 21 may confirm that the frequency of the pulse signal transmitted from the controller 1 is 1 kHz and determine that the input pulse signal is the first pulse signal $S_1$. The determination result is transmitted to the drive circuit selector 22.

The drive circuit selector 22 may transmit the first pulse signal $S_1$, which is transmitted from the pulse frequency determining circuit 21, to the pulse signal constant current conversion driver 23 via a transmission path. The pulse signal constant current conversion driver 23 may convert the first pulse signal $S_1$, which is transmitted from the drive circuit selector 22, to a constant current output and output it to the LED array 3. Thus, the LED arrays 3 can be driven in the continuous lighting mode.

When the LED array 3 are required to be driven in the intermittent lighting mode, the operation panel 15 may be used to make the control circuit 14 command the pulse signal selector 13 to select the second pulse signal $S_2$ and transmit it to the LED drivers 2. When the pulse signal selector 13 selects the second pulse signal $S_2$ and transmits it to the LED drivers 2, the second pulse signal $S_2$ may be input to the pulse frequency determining circuit 21 of the LED driver 2. The pulse frequency determining circuit 21 may confirm that the frequency of the pulse signal transmitted from the controller 1 is 2.5 kHz and determine that the input pulse signal is the second pulse signal $S_2$. The determination result is transmitted to the drive circuit selector 22.

The drive circuit selector 22 may transmit the second pulse signal $S_2$, which is transmitted from the pulse frequency determining circuit 21, to the pulse signal amplification driver 24 via a transmission path. The pulse signal amplification driver 24 may output pulses with the original pulse waveform of the second pulse signal $S_2$, which is transmitted from the drive circuit selector 22, to the LED array 3. In this manner, the LED arrays 3 can be driven in the intermittent lighting mode.

Thus, according to the lighting system for plant cultivation 9 of the present embodiment, the exposed state to light can be appropriately controlled with one configuration of light sources to match various conditions, such as growth situations and cultivation environments for plants and cultivated varieties, even without using different light sources in the continuous lighting mode and the intermittent lighting mode. In particular, when the exposure to light in a light and dark period corresponding to the cycle of photosynthesis is required, the pulse signal selector 13 may select the second pulse signal $S_2$, which is generated in the second pulse generating circuit 12 of the controller 1, and transmit the second pulse signal $S_2$ to the LED driver 2, and the pulse signal amplification driver 24 and the level comparator 25 may drive the LED array 3, which can thereby be controlled to be in the intermittent lighting mode. When the intermittent lighting mode is disadvantageous, the pulse signal selector 13 may select the first pulse signal $S_1$, which is generated in the first pulse generating circuit 11 of the controller 1, and transmit the first pulse signal $S_1$ to the LED driver 2, and the pulse signal constant current conversion driver 23 may drive the LED array 3, which can thereby be controlled to be in the continuous lighting mode. It is therefore possible to appropriately control the exposed state to light to match various conditions, such as growth situations and cultivation environments for plants and cultivated varieties. For example, the LED arrays 3 may be controlled to be in the continuous lighting mode during the seeding period and seedling growth period while the LED arrays 3 may be controlled to be in the intermittent lighting mode during the planting period and it is thereby possible to achieve the lighting which matches the growth situations of plants.

Figure 6:
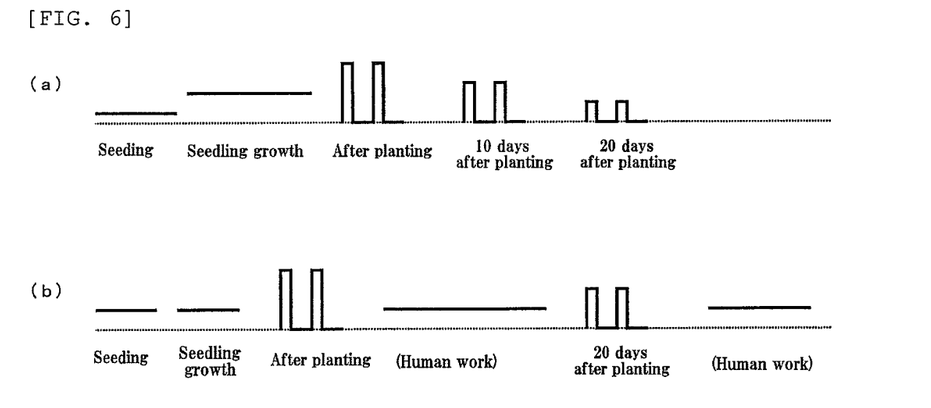
FIG. 6 is a set of explanatory views illustrating examples of schedules in which plants are cultivated using the lighting system for plant cultivation according to the embodiment.

Moreover, the lighting system for plant cultivation 9 according to the present embodiment may have the scheduling function using control data and it can thereby be possible to further promote the efficiency in plant cultivation and power saving. FIG. 6 illustrates cultivation schedules that are different in accordance with the varieties of plants to be cultivated and examples of control of the lighting system which match the schedules. In the example of FIG. 6(*a*), the LED arrays may be controlled to be in the continuous lighting mode during the seeding period and then controlled to be in the continuous lighting mode during the seedling growth period in which the light power is increased compared to the light power in the seeding period. Subsequently, after the planting, the mode may be switched to the intermittent lighting mode in which the LED arrays 3 are controlled. When ten days pass after the planting, the LED arrays 3 may be controlled to be in the intermittent lighting mode in which the light power is slightly reduced. When twenty days pass after the planting, the LED arrays 3 may be controlled to be in the intermittent lighting mode in which the light power is slightly reduced again.

In the example of FIG. 6(*b*), the LED arrays 3 may be controlled to be in the continuous lighting mode with substantially constant light power during the seeding period and the seedling growth period and, after the planting, the mode may be switched to the intermittent lighting mode in which the LED arrays 3 are controlled. This may be followed by a period in which a human work is needed. In this period, to prevent deconditioning due to the work in the flickering light, the LED arrays 3 may be controlled to be in the continuous lighting mode with substantially the same light power as that in the seeding period and the seedling growth period. Subsequently, when twenty days pass after the planting, the LED arrays 3 may be controlled to be in the intermittent lighting mode in which the light power is slightly reduced. This may be followed by a period in which a human work is needed again. In this period, therefore, the LED arrays 3 may be controlled to be in the continuous lighting mode again with substantially the same light power as that in the seeding period and the seedling growth period. Such schedules and corresponding control information for the lighting system may be stored in the computer 4 as control data, and the control circuit 14 can read the control data which is suitable for the cultivated variety.

Furthermore, the lighting system for plant cultivation 9 according to the present embodiment may be prepared with an interruption function into the continuous lighting mode using the human sensor 5. When the human sensor 5 detects the entry of a person into the plant cultivation area in the plant factory, the human sensor 5 may transmit an entry notification signal to the control circuit 14. Receiving the entry notification signal, the control circuit 14 may command the pulse signal selector 13 to select the first pulse signal $S_1$ and transmit it to the LED driver 2 to switch the LED array 3 to the continuous lighting mode even when the pulse signal selector 13 already selects the second pulse signal $S_2$ and transmits it to the LED driver 2 and the LED array 3 is controlled to be in the intermittent lighting mode. Thereafter, when a person completing the work in the plant cultivation area exits the area, the human sensor 5 can detect the exit and transmit the exit notification signal to the control circuit 14. Receiving the exit notification signal, the control circuit 14 may command the pulse signal selector 13 again to select the second pulse signal $S_2$ and transmit it to the LED driver 2 to switch the LED array 3 to the intermittent lighting mode.

Such an interruption function into the continuous lighting mode may be achieved using other means than the human sensor 5. For example, a manually-operable switch for transmitting a signal to switch between the intermittent lighting mode and the continuous lighting mode may be provided in the vicinity of the entrance into the plant cultivation area in the plant factory. In addition or alternatively, the system may be contrived to transmit a signal to switch between the intermittent lighting mode and the continuous lighting mode in accordance with the opening and closing of a door and/or an action of unlocking and locking a key.

The lighting system for plant cultivation according to the present invention has been described hereinbefore with reference to the drawings, but the present invention is not limited to the above embodiments and various modified embodiments can be carried out.

For example, the duty ratio of the second pulse signal $S_2$ generated in the second pulse generating circuit 12 is fixed at 30%, but is not limited to this. In an embodiment, the duty ratio of the second pulse signal $S_2$ may be variable to allow the ratio of the light period and the dark period to be varied in the lighting cycle in the intermittent lighting mode. When the duty ratio of the second pulse signal $S_2$ is also variable in such a manner, the exposed state to light can be appropriately controlled because the light and dark period can be set in accordance with the cycle of photosynthesis to match various conditions, such as growth situations and cultivation environments for plants and cultivated varieties.

In addition or alternatively, when the ratio of the light period and the dark period in the lighting cycle is varied, the emitting output of the light source may also be varied along therewith. That is, when the duty ratio of the second pulse signal $S_2$ is varied, the pulse wave height of the second pulse signal $S_2$ may also be varied along with the duty ratio. When the duty ratio is varied, the energy of light to which the plants are exposed per unit time also varies. If the light energy per unit time is unduly high, a so-called tip burn phenomenon may possibly occur. If the light energy per unit time is unduly low, problems may arise, such as poor growth. By varying the emitting output of the light source along with the duty ratio to be varied, the light energy can be maintained constant.

DESCRIPTION OF REFERENCE NUMERALS

9 Lighting system for plant cultivation
1 Controller
   11 First pulse generating circuit
   12 Second pulse generating circuit
   13 Pulse signal selector
   14 Control circuit
   15 Operation panel
   16 Schedule setting table
2 LED driver
   21 Pulse frequency determining circuit
   22 Drive circuit selector
   23 Pulse signal constant current conversion driver
   24 Pulse signal amplification driver
   25 Level comparator
3 LED array
4 Computer
5 Human sensor

The invention claimed is:

1. A lighting system for plant cultivation comprising:
a light source;
a light source driving unit that drives the light source; and
a control unit that transmits a pulse signal to the light source driving unit,
the control unit comprising:
a first pulse generating unit that generates a first pulse signal of a predetermined frequency;
a second pulse generating unit that generates a second pulse signal of a frequency different from the predetermined frequency; and
a pulse signal selecting unit that selects any one of the first pulse signal and the second pulse signal to transmit the selected one to the light source driving unit,
the light source driving unit comprising:
a frequency determining unit that determines whether the frequency of the pulse signal received from the control unit is the frequency of the first pulse signal or the frequency of the second pulse signal;
a first driving unit that, when receiving the first pulse signal from the control unit, converts the first pulse signal to a constant current output to drive the light source; and
a second driving unit that, when receiving the second pulse signal from the control unit, outputs a pulse with an original pulse waveform of the second pulse signal to drive the light source.

2. The lighting system for plant cultivation as recited in claim 1, further comprising
a data storage unit that stores control data for controlling the pulse signal selecting unit in accordance with a variety of a plant to be cultivated,
wherein the control unit controls an operation of the pulse signal selecting unit on a basis of the control data stored in the data storage unit.

3. The lighting system for plant cultivation as recited in claim 2, further comprising
an entry and exit information notifying unit that notifies the control unit of entry information in accordance with entry of a person into a cultivation area and notifies the control unit of exit information in accordance with exit of a person from the cultivation area,
wherein, during a period from when the entry and exit information notifying unit notifies the control unit of the entry information to when the entry and exit information notifying unit notifies the control unit of the exit information, the control unit makes the pulse signal selecting unit select the first pulse signal.

4. The lighting system for plant cultivation as recited in claim 1, further comprising
an entry and exit information notifying unit that notifies the control unit of entry information in accordance with entry of a person into a cultivation area and notifies the control unit of exit information in accordance with exit of a person from the cultivation area,
wherein, during a period from when the entry and exit information notifying unit notifies the control unit of the entry information to when the entry and exit information notifying unit notifies the control unit of the exit information, the control unit makes the pulse signal selecting unit select the first pulse signal.

* * * * *